United States Patent [19]

Koves

[11] Patent Number: 5,405,586
[45] Date of Patent: Apr. 11, 1995

[54] RADIAL FLOW HEAT EXCHANGING REACTOR

[75] Inventor: William J. Koves, Hoffman Estates, Ill.

[73] Assignee: Uop, Des Plaines, Ill.

[21] Appl. No.: 269,303

[22] Filed: Jun. 30, 1994

Related U.S. Application Data

[63] Continuation-in-part of Ser. No. 85,576, Jul. 1, 1993, abandoned.

[51] Int. Cl.$^6$ ............................ B01J 8/00; F28D 7/10
[52] U.S. Cl. ............................ 422/218; 165/157; 422/192; 422/197; 422/202; 422/211; 422/239
[58] Field of Search ............ 422/146, 173, 192, 196, 422/197, 198, 202, 203, 211, 216, 218, 239; 165/157, 158

[56] References Cited

U.S. PATENT DOCUMENTS

| | | | |
|---|---|---|---|
| 3,127,247 | 3/1964 | Davis, Jr. | 422/188 |
| 3,289,756 | 12/1966 | Jaeger | 165/158 X |
| 3,298,358 | 1/1967 | Alden, Jr. | 165/158 X |
| 4,256,783 | 3/1981 | Takada et al. | 422/197 |
| 4,660,632 | 4/1987 | Yampolsky et al. | 165/158 X |
| 4,743,432 | 5/1988 | Vollhardt | 422/196 |
| 4,810,472 | 5/1989 | Andrew et al. | 422/197 |
| 4,820,495 | 4/1989 | Vu et al. | 422/148 |
| 5,073,352 | 12/1991 | Vu et al. | 422/218 X |

Primary Examiner—Robert J. Warden
Assistant Examiner—L. M. Crawford
Attorney, Agent, or Firm—Thomas K. McBride; John G. Tolomei

[57] ABSTRACT

An isothermal reactor design uses interleaved layers of plate heat exchange elements to improve heat transfer in a radial flow arrangement that offers a simple and compact design for fluid flow and catalyst transfer.

13 Claims, 2 Drawing Sheets

RADIAL FLOW HEAT EXCHANGING REACTOR

CROSS REFERENCE TO RELATED APPLICATION

This application is a continuation-in-part of U.S. Ser. No. 08/085,576, filed Jul. 1, 1993, now abandoned.

FIELD OF THE INVENTION

This invention relates to an apparatus for performing catalytic chemical reactions while simultaneously heating or cooling reactants.

BACKGROUND OF THE INVENTION

Chemical reactions are routinely carried out by contacting one or more reactants with a catalyst at an elevated temperature and/or pressure. Ordinary reaction vessels heat or cool reactants before charging the reactants to a reaction zone to provide a suitable temperature for the reaction to occur. The reactions that occur are typically endothermic or exothermic in nature so that in order to achieve a suitable average temperature the reactants usually enter the reaction zone at a temperature above or below an optimal temperature for the reaction and/or leave the reaction zone at a temperature below or above an optimal temperature. The time that the reactants contact the catalyst at excessive or deficient temperatures negatively impacts the reaction. Negative impacts include catalyst activity losses and poor product selectivity.

Many prior art processes ameliorate the adverse temperature effects by dividing a reaction section into several separate zones to adjust the temperature of the reactants between zones by interstage heating or cooling. Interstage heating or cooling of the reactants between multiple reaction zones reduces the magnitude of the temperature variations but still does not completely solve the problems of excessive or deficient temperatures. In addition, some endothermic reactions would benefit from a rising temperature profile while passing through a catalyst bed. Interstage heating cannot provide a rising temperature profile for such endothermic reactions. Thus, chemical reactions can be carried out more effectively by maintaining a constant or increasing temperature profile for the entire time the reactants contact the catalyst.

The use of heat exchange elements within a catalyst bed are known to provide a more constant temperature for reactants in the catalyst bed. These heat exchanger reactors can maintain favorable reaction temperatures throughout a reaction zone. U.S. Pat. No. 4,810,472 depicts a bayonet tube arrangement for externally heating a reformer feed that passes through catalyst on the inside of the bayonet tube. U.S. Pat. No. 4,256,783 illustrates an arrangement for catalytic oxidation using multiple catalyst filled tubes immersed in a cooling fluid to control reaction temperatures. U.S. Pat. No. 4,743,432 discloses a reactor for the production of methanol having catalyst disposed in beds for contact with the reactants and cooling tubes passing through the beds for the removal of heat.

Although tubes are widely proposed to retain catalyst and reactants, or a heat exchange medium in heat exchange reactors, plate type heat exchange elements can provide greater and more effective heat exchange surface. U.S. Pat. No. 3,127,247 shows the use of cylindrical plates to form alternate annuli of heat exchange medium and catalyst in a heat exchanger reactor. U.S. Pat. No. 4,820,495 depicts a synthesis reactor for ammonia or ether production having adjacent elongate compartments alternately containing a heat carrier fluid and catalyst and reactants.

Similar to the arrangement disclosed in U.S. Pat. No. 4,820,495, a layered construction of substantially parallel plate heat exchange elements provides an effective arrangement of channels. In such arrangements every other channel contains catalyst through which reactants pass while a heat transfer fluid passes through the channels that do not contain catalyst. These channels offer a highly efficient heat transfer arrangement for controlling catalyst and reactant temperatures in catalytic processes. Since most of the catalytic reaction processes operate at elevated pressures, cost effective containment of the reaction process relies on cylindrical pressure vessels to house the catalyst and heat exchange elements. The most productive forming processes for the plate heat exchange elements yield thin, corrugated heat exchange elements in the form of substantially flat plates. Using indirect heat exchange to maintain a temperature that remains constant or opposes the heat effects of the reaction requires narrow reactant channels.

Arranging a large number of thin heat exchange plates to create narrow heat exchange channels poses mechanical and processing problems. The reactant channels must provide enough surface area to compensate for the loss of temperature differential between the reactants and the heat exchange fluid at the heat exchange fluid outlet. In addition the reactants and the heat exchange fluid may have different pressures that impose a differential loading across the plates. The plate elements must withstand differential pressure without excessive distortion. However from a structural standpoint flat plate elements operate inefficiently to withstand the normal loading from pressure differentials. Without adequate support the differential pressure loading can deform the thin plates. Moreover indirectly heating or cooling reactants adds additional distribution and collection conduits that further compound the problems of providing incorporating thin plate heat exchange elements into a reactor.

It is an object of this invention to provide an arrangement of heat exchanger reactor internals having radial fluid flow through narrow channels that is simple to construct and overcomes the problems of plate support and conduit arrangement for the supply and withdrawal of both heat exchange medium and reactants.

BRIEF DESCRIPTION OF THE INVENTION

This invention is an arrangement of reactor internals for directly contacting a radial flow of reactants with a particulate catalyst and indirectly contacting the reactants and catalyst with a radially flowing cooling or heating medium. The reactor internals consist of flow channels in the form of sectors that fill an annular volume of the reactor and use an arrangement of webs to simultaneously support thin wall heat exchange plates and provide flow distribution and collection chambers. Reactants and a heat exchange medium flow radially through alternate channels. The channels that receive the flow of reactants, i.e. every other channel, are filled with a particulate catalyst.

The arrangement also permits intermittent or continuous movement of catalyst through the reactor. The heat exchange medium and the reactants enter from the inner and outer periphery of the channels to keep the volume above and below the channels clear for catalyst addition and withdrawal. Catalyst can be added from above the channels and withdrawn from below the channels on a continuous or intermittent basis while the reactor is operating or during shutdown to change catalyst at the end of a run.

Accordingly in one embodiment this invention is a reactor apparatus for directly contacting a reactant stream with a catalyst and indirectly contacting the reactant stream with a heat exchange stream. The arrangement includes a cylindrical reactor vessel and a plurality of heat exchange plates radiating from a central portion of the reactor and sectoring an inner volume of the reactor vessel into a plurality of radial flow channels. Means are provided for occluding the outer circumference of the flow channels and an inner web extends longitudinally through at least a first portion of the flow channels and transversely bridges the channel space between adjacent heat exchange plates to subdivide the flow channels in the first portion of the flow channels into first and second chambers for distribution or collecting fluid. Additional means communicate the heat exchange stream with the first portion of the flow channels or a second portion of the flow channels, communicate the reactant stream with the other of the first and second portions of the flow channels, and communicate at least one of the of first or second chambers with a nozzle for adding or withdrawing fluid from the reactor vessel. Apertures defined at least in pan by the web communicate the first and the second chambers.

In a more limited embodiment this invention is a radial flow heat exchanger reactor apparatus for directly contacting a reactant stream with a catalyst and indirectly contacting the reactant stream with a heat exchange stream. The reactor arrangement comprises a cylindrical reactor vessel and a central duct extending longitudinally within the vessel for distributing or collecting a fluid. A plurality of heat exchange plates radiate from the central duct and sector an annular volume of the reactor vessel, defined in part by the central conduit, into a plurality of radial flow channels. Means are provided for occluding the outer circumference of at least a portion of the flow channels. An annular chamber is located about and defined by the outer circumference of the flow channels for distributing or collecting a fluid. Means are provided for communicating a first portion of the flow channels with the central conduit. An inner web extends longitudinally through a second portion of the flow channels and transversely bridges the channel space between adjacent heat exchange plates to subdivide the second portion of the flow channels and define an inner chamber between the inner web and the central conduit for distribution or collecting fluid. Means are provided for communicating one of the first portion and the second portion of the channels with the annular chamber. An outer web extends longitudinally through one of the first portion and the second portion of the flow channels and transversely bridges the channel space between adjacent heat exchange plates to subdivide a portion of the flow channels that do not communicate with the annular chamber and define an outer chamber between the outer web and the means for occluding the outer circumference for distributing or collecting fluid. Apertures defined at least in part by the webs communicate the remainder of the channels with the inner and the outer chambers.

In a yet more limited embodiment this invention is a reactor apparatus for directly contacting a reactant stream with a catalyst and indirectly contacting the reactant stream with a heat exchange stream, the arrangement comprises: a cylindrical reactor vessel; a central conduit extending longitudinally within said vessel for distributing a heat exchange fluid; a plurality of heat exchange plates radiating from the central conduit and sectoring an annular volume defined in pan by the central conduit into a plurality of heat exchange channels interleaved with reactant channels; an annular chamber for collecting a heat exchange fluid defined by the outer circumference of the flow channels and the cylindrical reactor vessel; an outer segment for closing the outer circumference of the reactant channels and occluding the outer circumference of the heat exchange channels, the segment defining a plurality of apertures communicating the heat exchange channels with the annular chamber; a plurality of apertures defined by the central conduit for communicating the heat exchange channels with the central conduit; an inner web and an outer web extending longitudinally through the reactant channels and transversely bridging the reactant channel space between adjacent heat exchange plates to subdivide the reactant flow channels and define an inner chamber between the inner web and the central conduit for collecting reactants, a central volume between the inner and outer webs for retaining catalyst particles, and an outer chamber between the outer web and the outer segment for distributing reactants; and, apertures defined by the webs for communicating the central volume with the inner chamber and the outer chamber.

Other and further objects of the present invention will become obvious upon an understanding of the embodiments about to be described or will be indicated in the appended claims, and various advantages not referred to herein will occur to one skilled in the an upon employment of the invention in practice.

DETAILED DESCRIPTION OF THE INVENTION

Figure 1:
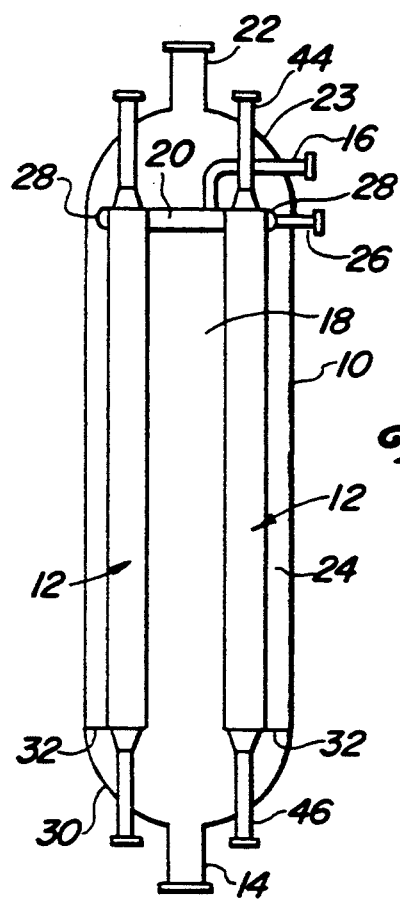
FIG. 1 is a cross-section showing an elevation of a reactor designed in accordance with this invention.

This invention is broadly applicable to any exothermic or endothermic chemical reaction process wherein it is desirable to overcome the temperature changes resulting from the exothermic or endothermic effects. Typical processes in which this reactor design may be used include reforming, dehydrogenation, oxygenation, and ethyl benzene synthesis. Thus the invention can be used to maintain isothermal conditions in a reaction zone that would otherwise undergo a temperature increase or decrease. Furthermore this invention may be used to progressively raise the bed temperature in endothermic reactions or lower the bed temperature in exothermic reactions. For example, in some endothermic reactions such as dehydrogenation and reforming, it may be desirable to have an increasing temperature profile through the reactor bed. Thus, the heat exchange elements of this invention may be arranged to provide an increasing temperature profile in such endothermic processes.

The use of plate type heat exchange elements provides a wide degree of flexibility in the control of temperatures when employing indirect heat exchange with a heating or cooling fluid. The invention operates with reactants moving in radial flow across one surface of the heat exchange elements and the heating or cooling fluid moving radially in cocurrent or countercurrent flow. Preferably the reactants and heat exchange fluid move in opposite directions to establish countercurrent flow. Countercurrent flow in a radial flow arrangement reduces the needed length of the heating medium flow path and offers the most effective use of the temperature differential between the reactant stream and the heat exchange medium for heating or cooling of the catalyst bed.

The amount of heating or cooling provided by the heat transfer medium to the reactants is also a function of the heat transfer surface between the two mediums. Increasing or decreasing the heat transfer surface in contact with the reactants and the heat transfer medium can provide further temperature control. For example, where the heat exchange medium is a heating medium, increasing the amount of heat transfer surface can provide additional heating of the catalyst bed. For the case of a cooling fluid, increased surface area can again provide increased cooling as contact with the heat exchange elements raises the temperature of the cooling fluid.

Preferably this arrangement of reactor internals employs a short radial length for the heat exchange channels relative to the reactor diameter. A short or limited radial length is desired to reduce the differential pressure through the channels and to control the change in width from the inside to the outside of the flow channel sectors. The diameter of the heat exchanger reactor can be selected to provide the desired radial channel length. Alternately the radial heat exchange channels can be divided into multiple rings of radial heat exchange channels to fill a large diameter reactor vessel while still restricting the radial heat transfer length of the channels. The arrangement associated with the cylindrical vessel and radial channels can be more readily appreciated by reference to FIGS. 1 through 3.

Referring then to FIG. 1, a cylindrical pressure vessel 10 houses a ring of radially and longitudinally extended channels 12 formed by a plurality of heat exchange plates. At least two streams of material move through reactor 10, a heat exchange medium and a reactant stream. The reactor has four nozzles that provide the fluid flow paths for the two streams. A nozzle 14 communicates with a central duct or central conduit 18. The channels 12 contained in a ring configuration are divided into two portions or groups comprising heat exchange channels and reactant channels. Conduit 18 delivers or collects heat exchange fluid or reactants to or from a first set of the channels. A conduit 16 communicates with a manifold 20 that delivers or collects one of the fluid streams from a second set of the channels through a hereinafter described chamber. Manifold 20 also serves as a partition to separate central conduit 18 from the interior volume of lead 23. Another nozzle 22 communicates with an annular space 24 that delivers or collects one of the fluid streams from one set of the channels. Lower partition plates 32 separate annular chamber 24 from the interior volume of head 30. Similar to nozzle 16 a nozzle 26 communicates with a manifold 28 to distribute or collect one of the fluid streams from one set of the channels via a hereinafter described additional channel. Each of nozzles 14 and 16 deliver or collect one of the fluid streams to or from the inside of one set of the channels and nozzles 22 and 26 deliver or collect one of the fluid streams to or from the outside of one set of the channels. The reactor arrangement may pair nozzle 14 with either of nozzles 26 or 22 to establish one fluid flow path and nozzle 16 may similarly be paired with one of nozzles 22 or 26 to establish a second fluid flow path.

In a preferred arrangement of this invention, the heat exchange medium enters reactor 10 via nozzle 14 and passes through the interior volume of head 30 into central conduit 18 which distributes the heat exchange medium over the inside surface of the heat exchange channels. Annular chamber 24 collects heat exchange medium from the outside surface of the heat exchange channels. The exiting heat exchange medium passes through the interior volume of head 23 and out of the reactor through nozzle 22. Again, in the preferred embodiment, nozzle 16 and manifold 20 deliver the reactant stream to an inside surface of the reactant channels and manifold 28 and nozzle 26 withdraws the reactants from the outside surface of the reactant channels. In an alternate embodiment, consistent with FIGS. 2 and 3, nozzle 26 and manifold 28 deliver the reactant stream to an outside surface of the reactant channels, and manifold 20 and nozzle 16 withdraw the reactants from the outside surface of the reactant channels.

The reactor may also accommodate the transfer of catalyst through the heat exchanger banks in order to provide a continuous catalyst circulation through the reactant channels. In such an arrangement, catalyst enters through catalyst transfer pipe 44 and is distributed into the reactant channels of the heat exchanger channels 12. A nozzle 46 withdraws catalyst from the reactant channels for treatment such as regeneration. The arrangement of the heat exchanger channels and the reactant and heat exchange channels are further depicted in FIG. 2.

Figure 2:
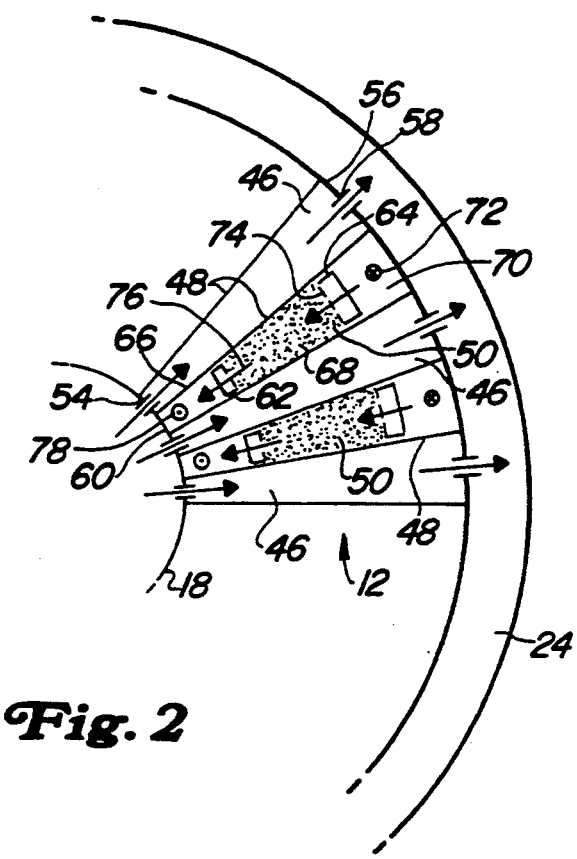
FIG. 2 is a partial section taken across line A—A of FIG. 1.

FIG. 2 shows the cross-section of the heat exchange channels 12. Looking at FIG. 2, substantially flat heat exchange plates 48 define alternate heat exchange channels 46 and reactant channels 50. Heat transfer plates 48 are preferably formed from thin material having a thickness of about 1 millimeter. The material preferably contains corrugations to improve the heat transfer by increasing the heat transfer surface and improving the distribution of flow over the surface of the plates. Specific design and forming methods for plate heat exchange element are known to those skilled in the art. The plates 48 isolate the sides of the heat exchange channels from the reactant channels and keep the heat exchange medium from mixing with the reactants.

The heat exchange plates 48 radiate from the central conduit 18 to sector the ring of channels 12. Preferably heat exchange channels 46 and reactant channels 50 alternate in an interleaved fashion and form the annular ring of heat exchange channels 12 that encircle the central conduit 18. Preferably heat exchange plates 48 sector the annular volume to the outside of conduit 18 into sectors having an equal are angle. In the arrangement depicted by FIG. 2, central conduit 18 forms an inner closure for reactant channels 50 that completely blocks communication of the reactant channels with central conduit 18. Means are provided at the outside of the channels for blocking or restricting flow. For example, a segment 52 at the outside of reactant channels completely blocks fluid communication between the reactant channel and the annular chamber 24. Apertures 54 in central conduit 18 communicate the central conduit with the inner end of heat exchange channels 46. A segment 56 at the end of heat exchange channels 46 defines apertures 58 from which the heat exchange medium leaves heat exchange channels 46.

In this preferred embodiment, the inner surface 60 and the outer surface 52 of the reactant channels are completely closed to fluid flow. An inner web 62 and an outer web 64 subdivide the reactant channel into an inner chamber 66, a central chamber 68, and an outer chamber 70. The web may be a an independent member or may be formed in part or completely by the heat exchange plates. Reactants entering the reactor flow downwardly through outer chamber 70 as indicated by direction circle 72. Apertures 74 defined by web 64 distribute reactants over the longitudinal length of central chamber 68. Apertures may also be formed by protrusions of the heat exchange plates into the channel to each form half of an integral webs. The integral webs can be separated to leave a series of gaps that define the apertures. Central chamber 68 contains catalyst that the reactants contact. Apertures 76 defined by web 62 provide openings for reactants to enter inner chamber 66. Inner chamber 66 collects the reactants which travel upwardly through the chamber along the path indicated by direction circle 78.

Figure 3:
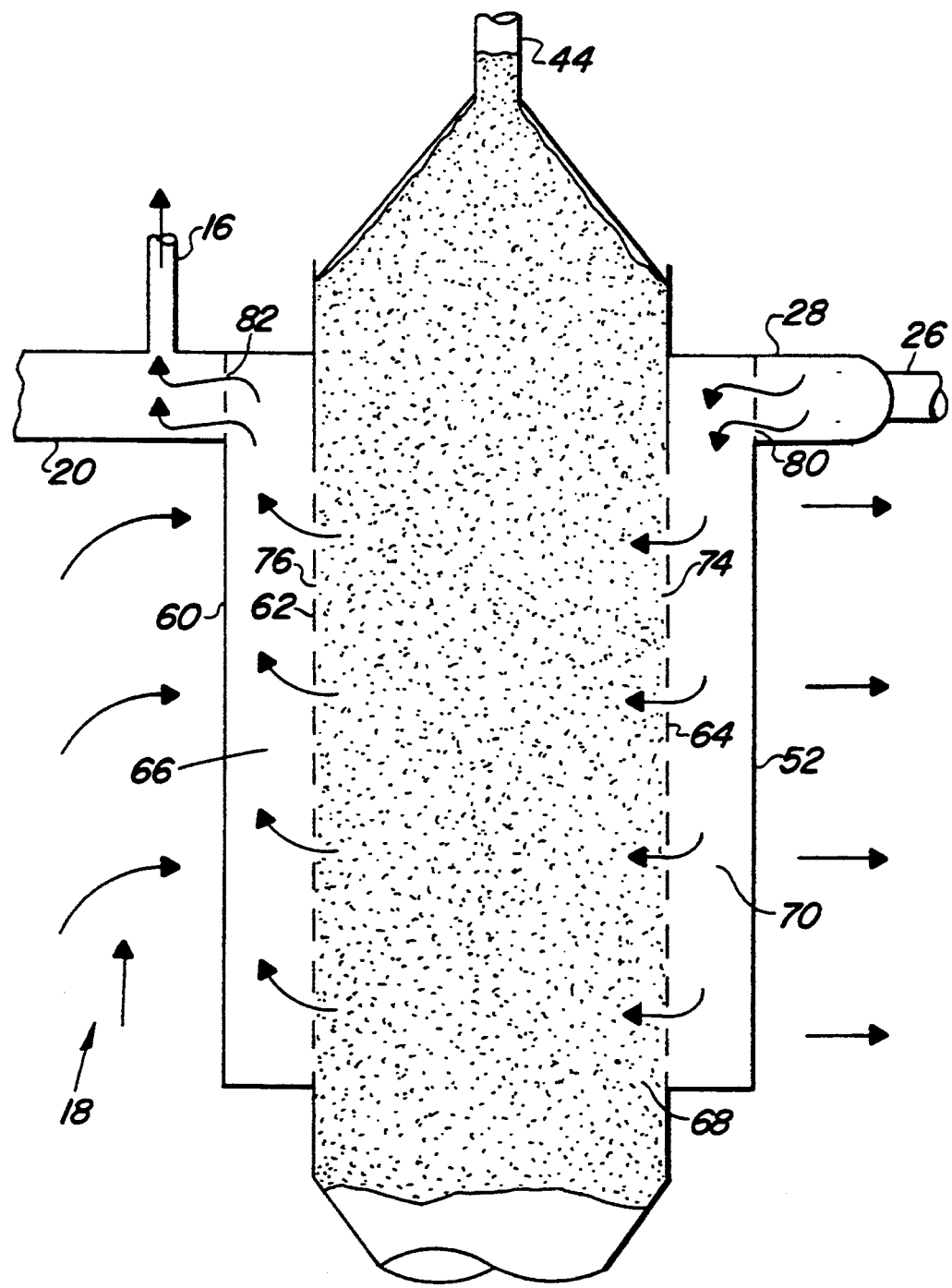
FIG. 3 is enlarged plan of the reactor internal taken across line B—B of FIG. 2.

FIG. 3 further illustrates the arrangement of the reactant channels. Manifold 28 distributes reactants entering via nozzle 26 over the ring of reactant channels and through holes 80 defined at the top of segments 52. Outer chamber 70 distributes reactants over the face of web 64 and through apertures 74 into contact with the catalyst in central chamber 68. Reactants flow out of central chamber 68 across web 62 through apertures 76. Inner chamber 66 collects the reactants which pass through holes 82 at the top of segment 60. Manifold 20 collects the reactant vapors for withdrawal from the reactor vessel through nozzle 16.

Catalysts enters central space 68 through nozzle 44. The catalyst may be continually or intermittently moved through chamber 68 to provide the moving catalyst operation as previously described. Alternately, inlet catalyst nozzle 44 and outlet catalyst nozzle 46 (not shown in FIG. 3) may be used to unload spent catalyst and load fresh catalyst when the reactor is shut down.

Again, this invention is not limited to a specific arrangement of webs and channels shown in FIG. 3. For example, each reactant channel and heat exchange channel may contain a web such that each channel is subdivided. In such an arrangement, nozzle 14 and nozzle 26 would provide one fluid flow path while nozzle 22 and nozzle 16 would provide the other flow path. Those skilled in the an are aware of a variety of other variations in this arrangement that can be used to derive the benefits of this invention.

I claim:

1. A reactor apparatus for directly contacting a reactant stream with a catalyst and indirectly contacting the reactant stream with a heat exchange stream, said arrangement comprising:
   a) a cylindrical reactor vessel;
   b) a central conduit extending axially within said vessel for distributing or collecting a fluid;
   c) a plurality of heat exchange plates radiating from said central conduit and sectoring an annular volume defined in part by said central conduit into a plurality of radial flow channels;
   d) means for occluding the outer circumference of said flow channels;
   e) an annular chamber located about and defined by the outer circumference of said flow channels for distributing or collecting a fluid;
   f) means for communicating a first portion of said flow channels with said central conduit and said annular chamber;
   g) an inner web and an outer web extending axially through a second portion of said flow channels and transversely bridging the channel space between adjacent heat exchange plates to subdivide said second portion of said flow channels and define an inner chamber between said inner web and said central conduit for distributing or collecting fluid, a central volume between said inner and outer webs, and an outer chamber between said outer web and said means for occluding the outer circumference for distributing or collecting fluid; and,
   h) apertures defined at least in part by said webs for communicating said central volume with said inner chamber and said outer chamber.

2. The apparatus of claim 1 wherein a flow channel of said first portion is located between each flow channel of said second portion.

3. The apparatus of claim 1 wherein said flow channels are sectored by the same included angle.

4. The apparatus of claim 1, wherein one of said first portion and said second portion of flow channels communicates with means for adding catalyst particles to the top and withdrawing catalyst particles from said flow channels.

5. The apparatus of claim 4 wherein said means for adding catalyst communicates with said second portion of flow channels.

6. The apparatus of claim 1 wherein said apertures comprise a plurality of perforation defined by said webs.

7. The apparatus of claim 1 wherein said heat exchange plates define said webs.

8. The apparatus of claim 1 wherein said heat exchange plates define corrugations.

9. The A reactor apparatus for directly contacting a reactant stream with a catalyst and indirectly contacting the reactant stream with a heat exchange stream, said arrangement comprising:
   a) a cylindrical reactor vessel;
   b) a central conduit extending axially within said vessel for distributing a heat exchange fluid;
   c) a plurality of heat exchange plates radiating from said central conduit and sectoring an annular volume defined in part by said central conduit into a plurality of heat exchange channels interleaved with reactant channels;
   d) an annular chamber for collecting a heat exchange fluid defined by the outer circumference of said flow channels and said cylindrical reactor vessel;
   e) an outer segment for closing the outer circumference of said reactant channels and occluding the outer circumference of said heat exchange channels, said segment defining a plurality of apertures communicating said heat exchange channels with said annular chamber;
   f) a plurality of apertures defined by said central conduit for communicating said heat exchange channels with said annular chamber;
   g) an inner and an outer web extending axially through said reactant channels and transversely bridging the reactant channel space between adjacent heat exchange plates to subdivide said reactant flow channels and define an inner chamber between said inner web and said central conduit for collecting reactants, a central volume between said inner and outer webs for retaining catalyst particles, and an outer web and said outer segment for distributing reactants; and h) apertures defined by said webs for communicating said central volume with said inner chamber and said outer chamber.

10. The apparatus of claim 9 wherein said heat exchange channels and said reactant channels are sectored by the same included angle.

11. The apparatus of claim 9 wherein at least one of said reactant channels communicates with the means for adding catalyst particles to the top and withdrawing catalyst particles, from the bottom of said reactant channels.

12. The apparatus of claim 9 wherein said heat exchange plates define said webs.

13. The apparatus of claim 9 wherein said heat exchange plates define corrugations.

* * * * *